(12) United States Patent
Mueller et al.

(10) Patent No.: US 9,308,983 B2
(45) Date of Patent: Apr. 12, 2016

(54) NON-FOGGING VEHICLE WINDOW

(71) Applicant: AIRBUS OPERATIONS GMBH, Hamburg (DE)

(72) Inventors: Rainer Mueller, Rosengarten (DE); Jens Elmers, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 409 days.

(21) Appl. No.: 13/761,584

(22) Filed: Feb. 7, 2013

(65) Prior Publication Data

US 2013/0168495 A1 Jul. 4, 2013

Related U.S. Application Data

(63) Continuation of application No. PCT/EP2011/063826, filed on Aug. 11, 2011.

(60) Provisional application No. 61/373,056, filed on Aug. 12, 2010.

(30) Foreign Application Priority Data

Aug. 12, 2010 (DE) .......................... 10 2010 034 080

(51) Int. Cl.
*B64C 1/14* (2006.01)
*B60J 1/00* (2006.01)

(52) U.S. Cl.
CPC .............. *B64C 1/1484* (2013.01); *B60J 1/002* (2013.01); *B64C 1/1492* (2013.01)

(58) Field of Classification Search
CPC ...... B64C 1/1484; B64C 1/1492; B60J 1/002; E06B 3/677; E06B 2007/026
See application file for complete search history.

(56) References Cited

U.S. PATENT DOCUMENTS 2,166,108 A * 7/1939 Jensen ...................... B60S 1/54
200/209
2,332,060 A * 10/1943 Colleran ...................... 52/171.2

(Continued)

FOREIGN PATENT DOCUMENTS

DE 19806108 A1 8/1999
EP 0936138 A2 8/1999

(Continued)

OTHER PUBLICATIONS

German Patent Office, German Office Action dated Feb. 28, 2011 for German Patent Application No. 102010034080.4.
International Searching Authority, International Search Report dated Dec. 23, 2011 for International Application No. PCT/EP2011/063826.

*Primary Examiner* — Joseph W Sanderson
(74) *Attorney, Agent, or Firm* — Ingrassia Fisher & Lorenz, P.C.

(57) ABSTRACT

A vehicle window with a primary window pane arrangement, a secondary window pane that is spaced apart from the primary window pane arrangement and a window funnel that extends between the secondary window pane and the primary window pane arrangement is provided. The vehicle window includes an intermediate space that is formed by the window funnel, the secondary window pane and the primary window pane arrangement, and the intermediate space is sealed and equipped with an air inlet for introducing dehumidified air into the intermediate space. Due to the seal, humid air leading to condensation and frost in the intermediate space is prevented from flowing into the intermediate space during a pressure compensation flow. The passenger comfort is enhanced due to the improved view through the window.

13 Claims, 7 Drawing Sheets

(56) References Cited

U.S. PATENT DOCUMENTS

| | | | |
|---|---|---|---|
| 2,575,757 A | * 11/1951 | Hardy | 52/202 |
| 4,932,608 A | 6/1990 | Heidish et al. | |
| 4,979,342 A | * 12/1990 | Holdridge et al. | 52/171.1 |
| 5,884,865 A | * 3/1999 | Scherer et al. | 244/129.3 |
| 5,988,566 A | 11/1999 | Meyer | |
| 6,168,112 B1 | * 1/2001 | Mueller et al. | 244/129.3 |
| 2003/0217522 A1 | * 11/2003 | Bendy | 52/171.3 |

FOREIGN PATENT DOCUMENTS

| | | | | |
|---|---|---|---|---|
| EP | 0936139 A2 | | 8/1999 | |
| GB | 2281390 A | * | 3/1995 | E06B 7/03 |

\* cited by examiner

PRIOR ART:

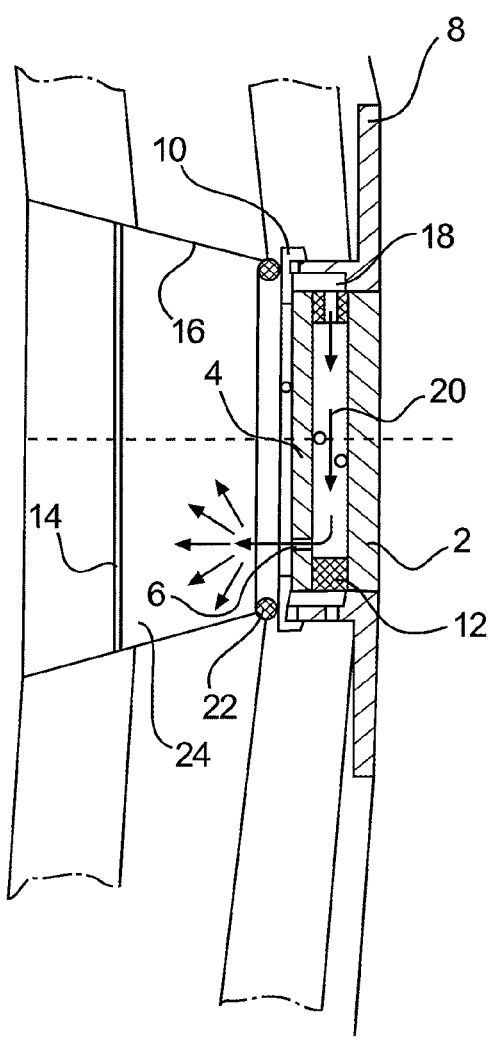
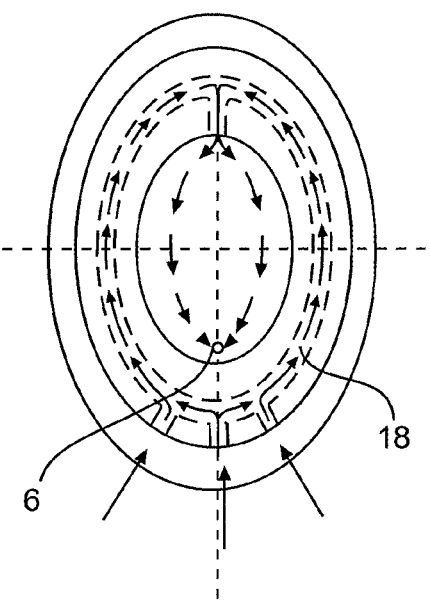
Fig. 2B
Fig. 2A

NON-FOGGING VEHICLE WINDOW

CROSS-REFERENCE TO RELATED APPLICATIONS

This is a continuation of International Application No. PCT/EP2011/063826, filed Aug. 11, 2011, which claims priority to German Patent Application No. 10 2010 034 080.4, filed Aug. 12, 2010 and to U.S. Provisional Patent Application No. 61/373,056, filed Aug. 12, 2010, which are each incorporated herein by reference in their entirety.

TECHNICAL FIELD

The technical field pertains to a vehicle window with a primary window pane arrangement, a secondary window pane that is spaced apart from the primary window pane arrangement and a window funnel that extends between the secondary window pane and the primary window pane arrangement. The technical field furthermore pertains to an aircraft that is equipped with a plurality of vehicle windows of this type.

BACKGROUND

Cabin windows of larger vehicles, particularly of widebody aircraft, mostly include several individual window panes. In this case, one frequently distinguishes between a primary window pane set and a secondary window pane, wherein the primary window pane set may, depending on the type and design of the respective aircraft, be composed of two different primary window panes that are spaced apart from one another. The function of the outer primary window pane, particularly in aircraft, consists of bearing the load resulting from a pressure differential between the passenger cabin and the surroundings of the aircraft and to prevent the escape of air from the passenger cabin into the surroundings. An inner primary window pane is provided for safety reasons in order to at least largely fulfill the function of the outer primary window pane in case it is damaged. If the primary window pane set contains several window panes that are spaced apart from one another, a hollow space is formed that can be ventilated, for example, via a bore in the primary window pane facing the inner side of the vehicle in order to achieve a pressure compensation. In consequence of the humidity of the inflowing air from the passenger cabin during the pressure compensation, condensation or frost may form on the two primary window panes, particularly in aircraft due to the low surface temperatures during a flight. This impairs the outward view of the respective passenger and therefore compromises personal comfort.

In addition, condensation water forming, for example, during the descent of an aircraft may accumulate in the hollow space between the primary window panes, but can no longer drain due to the window seal between the primary window panes. This in turn causes the primary window panes to fog up again faster after each flight if the aircraft only remains on the ground for a relatively short time and the condensation water cannot completely evaporate.

EP 0 936 138 A2 and EP 0 936 139 A2 disclose cabin windows for an aircraft that do not comprise a compensation bore in the inner primary window pane, but rather a so-called condensation channel that is peripherally arranged on the primary window panes. This condensation channel is formed by a window frame, the primary window pane set and a press-on frame. Due to this channel, only air that flows along the very cold window frame during the flight and therefore is condensed and pre-dehumidified outside the visual range of the window can flow into the hollow space between the window panes of the primary window set. In this way, condensation on the panes of the primary window pane set, as well as fogging thereof, can be prevented on the sides facing the hollow space.

In addition, other objects, desirable features and characteristics will become apparent from the subsequent summary and detailed description, and the appended claims, taken in conjunction with the accompanying drawings and this background.

SUMMARY

This known condensation channel, however, is unable to maintain the side of an inner window pane of the primary window pane set which faces the cabin free of ice and fog. This especially applies if the humidity in the passenger cabin is particularly high such as, for example, when artificial cabin humidification is used. This type of humidification is increasingly utilized in the construction of passenger aircraft in order to improve the air quality, in particular, during long-distance flights.

According to various exemplary embodiments of the present disclosure, provided is a vehicle window of the initially cited type, in which fogging can be prevented not only between the window panes of a primary window set, but also on the side of an inner window pane of the primary window pane set which faces the cabin and in the intermediate space between a secondary pane and the primary window pane set.

According to one of various exemplary aspects of the present disclosure, a vehicle window of this type with a primary window pane arrangement, a secondary window pane that is spaced apart from the primary window pane arrangement and a window funnel that extends between the secondary window pane and the primary window pane arrangement comprises an intermediate space that is defined by the window funnel, the secondary window pane and the primary window pane arrangement. According to the present disclosure, this intermediate space is sealed and comprises an air inlet for introducing dehumidified air into the intermediate space.

During an air flow into the intermediate space or out of the intermediate space in consequence of a pressure variation, only dehumidified air can be admitted into the intermediate space due to the hermetic seal of the intermediate space and the defined air inlet. In this way, more humid air that originates, e.g., from the passenger cabin, can be prevented from flowing into the intermediate space and from causing condensation and frost on the secondary window pane or on the primary window pane arrangement. This also improves the sense of comfort of the passengers of the respective aircraft because an unobstructed outward view is always maintained. In addition, condensation water is simultaneously prevented from accumulating between the secondary window pane and the primary window pane arrangement and from draining into insulation packs or other equipment elements on the skin of the vehicle.

In this context, the term window funnel refers to a device that can isolate the window from other equipment elements arranged adjacent to the vehicle window. This mostly concerns a funnel-shaped component with an oval cross section that widens from the primary window pane arrangement toward the secondary window pane. In the context of this disclosure, the window funnel does not necessarily have to be realized in the shape of a funnel or have an oval cross section, but rather may include any arbitrary transition between a secondary window pane and a primary window pane arrangement.

In addition, the air inlet may be arranged at an arbitrary location of the vehicle window and is not subject to any restrictions with respect to its type or design. In fact, the air inlet may be realized in the form of a supply line, a bore, an opening, an overflow channel or the like. The primary function of the air inlet comprises ensuring that dry air can flow into the intermediate space through the air inlet.

In an exemplary embodiment of the present disclosure, a sealing element is arranged between the window funnel and a boundary surface of the primary window pane arrangement which is directed toward the secondary window pane. The sealing element should be realized in such a way that the intermediate space can be outwardly sealed in a hermetic fashion. In this case, the sealing element may be designed with an arbitrary shape that makes it possible to produce a hermetic seal. It may be practical to utilize sealing rings or closed sealing lips that are made of a permanently elastic material and held in the intended position with suitable means. As an alternative to one-piece sealing elements that are installed separately, it would also be conceivable to apply an elastic material, e.g., in the form of silicone, acrylic or comparable materials. The boundary surface of the primary window pane arrangement may be realized in the form of a frame, press-on frame, retaining ring or the like that is directed toward the secondary window pane, but the type of which primarily depends on the type and design of the primary window pane arrangement. In the construction of aircraft, for example, an established design comprises a window seal 12 that can accommodate two primary window panes at a certain distance from one another, wherein this window seal 12 is pressed against a window frame by means of a press-on frame. In this example, the sealing element may be arranged between the window funnel and the primary window pane arrangement with the press-on frame.

In order to prevent condensation water from accumulating in the hollow space between two primary window panes of a primary window pane arrangement, the prior art proposes vehicle windows with a peripherally arranged condensation channel, from which air can flow into the hollow space in order to realize a pressure compensation. If the ambient temperature of the vehicle is lower than the temperature of the air flowing into the condensation channel, the humidity of the inflowing air condenses outside the visual range of the window because it flows over the wall surfaces of the condensation channel which are cooled due to the low ambient temperature, namely such that the air flowing out of the condensation channel can be introduced between the primary window panes in a pre-dehumidified fashion. In an exemplary embodiment of the present disclosure, the hollow space between the primary window panes is fluidically connected to the intermediate space between the secondary window pane and the primary window pane arrangement. Pre-dehumidified air introduced into the hollow space between the primary window panes therefore can also flow from this hollow space into the intermediate space toward the secondary window pane and also displace air with higher humidity therein. This can only be achieved with the hermetic seal of the intermediate space because air can only flow from the hollow space between the primary window panes into the intermediate space toward the secondary window pane during a pressure compensation flow such that only dehumidified air is introduced into the intermediate space. A backflow into the hollow space between the primary window panes is harmless due to the fact that the humidity already was significantly reduced beforehand.

In another exemplary embodiment of the present disclosure, the air inlet of the intermediate space may be realized in that a press-on frame for pressing the primary window pane arrangement against a vehicle window frame comprises a bore, through which air can flow from the hollow space between the primary window panes into the intermediate space toward the secondary window pane. In this way, no additional components that would increase the complexity and the manufacturing costs of the vehicle window according to the present disclosure are required. In this context, it is advantageous that neither of the primary window panes comprises a bore.

In another exemplary embodiment of the present disclosure, the intermediate space may also be connected to a separate condensation channel that is formed in or on or entirely outside the vehicle window according to the present disclosure. The air inlet is realized in the form of an end of the condensation channel which is connected to the intermediate space. In this context, separate means that this condensation channel is provided independently and separately and not realized in the form of a condensation channel used for pre-dehumidifying air for the hollow space between the primary window panes. This separate condensation channel may be realized, for example, in a region outside the window funnel which is connected to the vehicle skin and can cause condensation, for example, in the presence of lower temperatures. The design of the condensation channel may include any type of air conduit that can be thermally connected to a vehicle skin, wherein the air conduit may be manufactured of a plastic material or a metallic material and have a round, elliptical, oval or angular cross section. When utilizing a separate condensation channel, it is not necessary to provide additional air inlets in the form of bores or overflow channels leading into the hollow space between the primary window panes such that the air required for the pressure compensation is introduced into the intermediate space through the separate condensation channel only.

According to various exemplary embodiments, the present disclosure also provides an aircraft that comprises a fuselage with a plurality of windows, wherein the windows respectively comprise a primary window pane arrangement, a secondary window pane that is spaced apart from the primary window pane arrangement and a window funnel that extends between the secondary window pane and the primary window pane arrangement. An intermediate space formed by the window funnel, the secondary window pane and the primary window pane arrangement is sealed and comprises an air inlet for introducing dehumidified air into the intermediate space.

All aforementioned exemplary embodiments of the vehicle window can also be applied to the windows of the aircraft according to the present disclosure described below.

In another exemplary embodiment of the aircraft according to the present disclosure, the air inlet may furthermore be connected to an air source of an air-conditioning system. A vehicle that is used for transporting passengers is usually provided with air-conditioning systems that are designed for conditioning the air and for maintaining the physical comfort of the passengers at the highest level possible. An air-conditioning system not only influences the air temperature, but also the humidity. It would therefore be conceivable to connect the intermediate space between the secondary window pane and the primary window pane arrangement to a source of conditioned air that usually has a relative humidity far below about 100%. If pressure compensation is required in the intermediate space, air from this air source can flow into the intermediate space. The hermetic seal of the intermediate space makes it possible to prevent air from other sources from flowing into the intermediate space and causing condensation therein. At an air pressure that lies above the air pressure in the intermediate space, it is more likely that the opposite occurs, namely that air flows out of the intermediate space through minute openings or gaps of the intermediate space due to the higher pressure at the air inlet.

It would also be conceivable to create an air outlet arranged opposite of the air inlet in the intermediate space in order to continuously sweep the intermediate space due to the constant inflow of conditioned air through the air inlet and the air discharge through the air outlet. If the intermediate space is continuously swept, it is expected that the intermediate space assumes a temperature that is unlikely to increase the relative humidity to about 100% or beyond. In this way, the condensation tendency within this intermediate space can be significantly reduced on the secondary window pane or a primary window pane.

Dehumidifying devices that route particularly dry air past insulating packs fixed on the frames through channel-like cavities are occasionally utilized, for example, in aircraft, the skin of which is subjected to very low temperatures due to high cruising altitudes and therefore causes the formation of condensate on or in the insulation packs arranged on the aircraft skin. These dry air flows may be achieved, for example, with dehumidifying devices, in which a hygroscopic material such as silica gel is used. In another exemplary embodiment of the present disclosure, this dry air flow that already flows in the immediate vicinity of the aircraft window may also be used for being routed into the intermediate space between the secondary window pane and the primary window pane arrangement through the air inlet during a pressure compensation flow. In this way, the risk of water condensing in the intermediate space can be significantly reduced.

In another exemplary embodiment, a fluidic connection is produced between the hollow space of the primary window pane arrangement and the intermediate space such that an air exchange between the hollow space and the intermediate space can be achieved.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 2A and FIG. 2B show an exemplary embodiment of the vehicle window according to the present disclosure;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
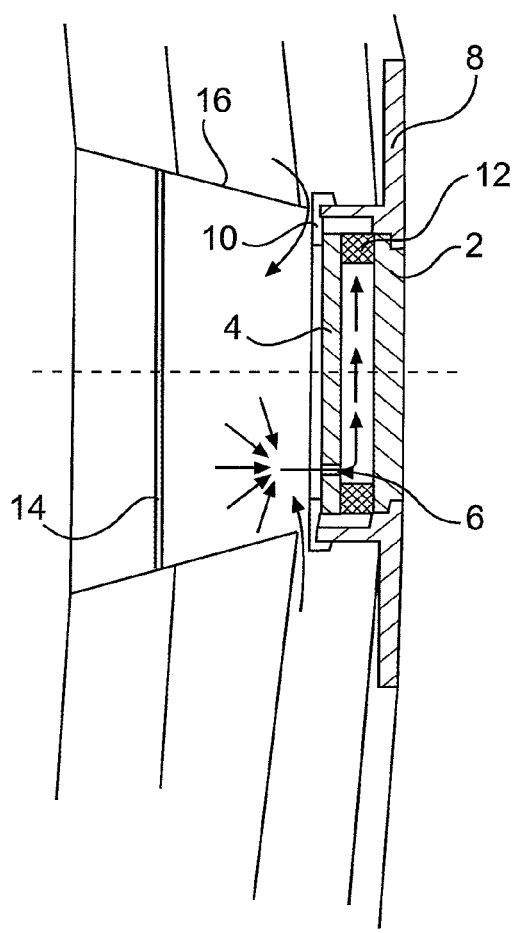
FIG. 1A and FIG. 1B show a vehicle window according to the prior art.
Figure 1B:
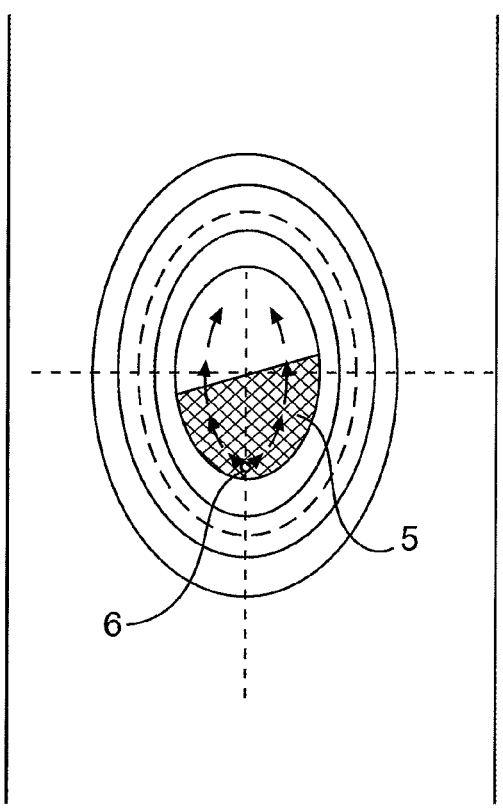

Referring to FIGS. 1A and 1B, a secondary window pane 14 with a larger surface area than the primary window panes 2 and 4 is arranged at a distance from the primary window pane arrangement and situated in or on a window funnel 16 that is tapered from the secondary window pane 14 toward the inner primary window pane 4. Fogging can be prevented at this location due to the introduction of cabin air between the outer primary window pane 2 and the inner primary window pane 4 during a pressure compensation flow. Due to the temperature gradient of an aircraft window, however, condensation 5 and frost may still occur between the secondary window pane 14 and the inner primary window pane 4 through gaps between the window funnel 16 and the primary window pane arrangement such that the view through the secondary window pane 14 and the inner primary window pane 4 is partially obstructed.

FIG. 2 shows a vehicle window that substantially corresponds to the vehicle window of FIG. 1, but comprises a so-called condensation channel 18 that is peripherally arranged on the vehicle window between the window frame 8 and the inner primary window pane 4. This condensation channel comprises one or more dedicated air inlets for taking in air, for example, from a passenger cabin and causes only pre-dehumidified air to flow through a hollow space 20 formed between the outer primary window pane 2 and the inner primary window pane 4. For this purpose, the condensation channel 18 is thermally connected to the window frame 8 that, in the case of a cruising aircraft, has a very low temperature and causes the humidity to condense outside the visual range.

According to the various teachings of the present disclosure, the inner primary window pane 4 comprises an air inlet in the form of a bore 6, through which dehumidified air flows from the hollow space 20 into an intermediate space 24 between the inner primary window pane 4 and the secondary window pane 14. In order to intensify the effect of displacing humid air from this intermediate space 24, a sealing element 22 is arranged between the window funnel 16 and the press-on frame 10 such that a lateral inflow of air with condensation tendency through openings can be prevented. The intermediate space therefore is also swept with pre-dehumidified air and the accumulation of condensate or frost is prevented.

Figure 3:
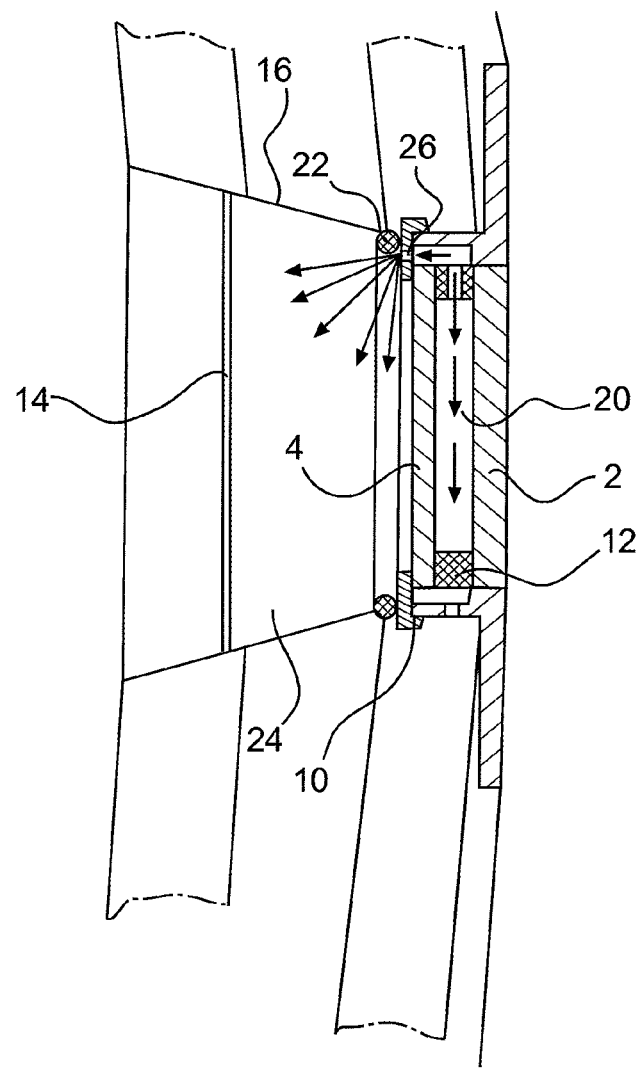
FIG. 3 shows another exemplary embodiment of the vehicle window according to the present disclosure.

FIG. 3 shows another exemplary embodiment, in which the press-on the frame 10 comprises an air inlet in the form of a bore 26 that makes a separate bore in the inner primary window pane 4 obsolete. In this case, the bore 26 needs to be arranged such that the sealing element 22 is situated a certain distance radially outward of the bore 26 in order to allow an undisturbed inflow of pre-dehumidified air into the intermediate space 24 during a pressure compensation flow.

Figure 4:
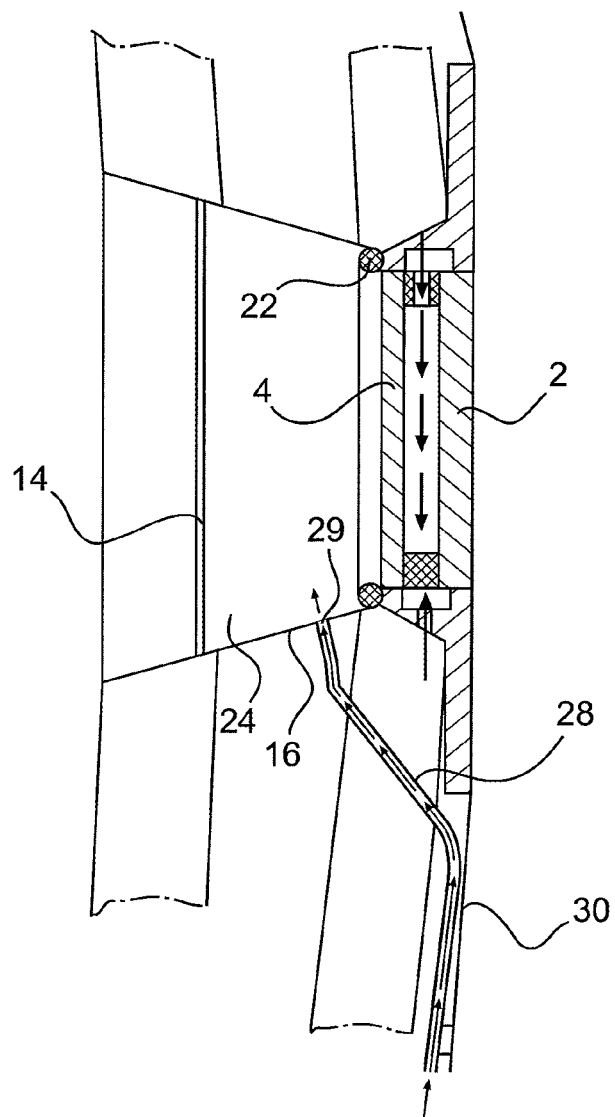
FIG. 4 shows another exemplary embodiment of the vehicle window according to the present disclosure.

Another option for introducing pre-dehumidified air into the intermediate space 24 is illustrated in FIG. 4. In this case, air is supplied from an additional and separate condensation channel 28 that is thermally connected to and separately routed along a vehicle skin 30 in the form of an air conduit with a relatively small flow cross section. In this case, an end 29 of the condensation channel 28 represents the air inlet. When air flows into the intermediate space 24 through the condensation channel 28 in order to realize the pressure compensation, the temperature of the air is reduced due to the cooled wall of the condensation channel 28 such that humidity condenses and the air is dehumidified. In this variation, a bore is neither required in the inner primary window pane 4 nor in the press-on frame 10.

Figures 5A, 5B:
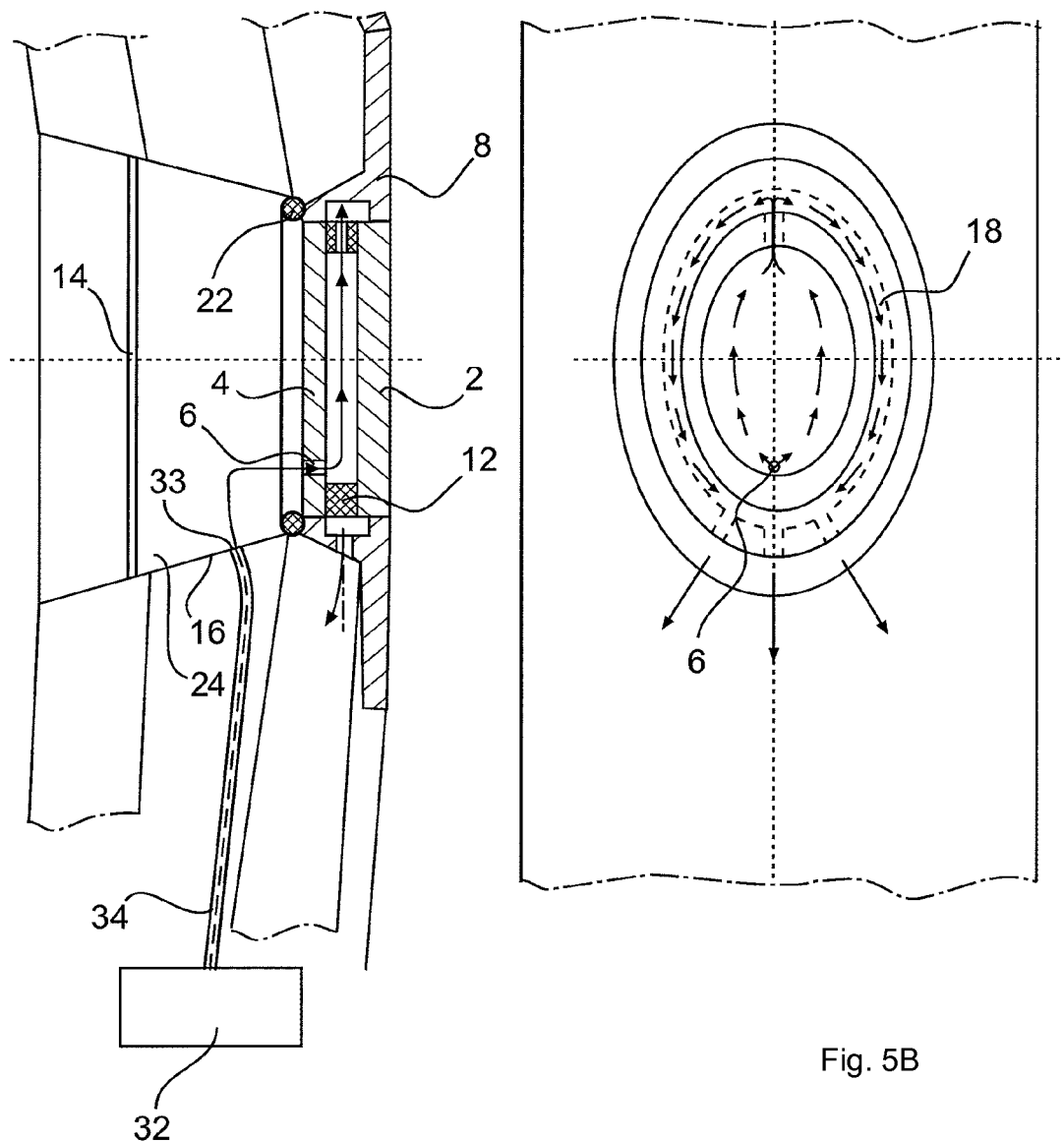
FIG. 5A and FIG. 5B show another exemplary embodiment of the vehicle window according to the present disclosure.

FIG. 5 shows a connection between an air-conditioning system or dehumidifying system 32 and the intermediate space 24 by means of an end 33 of an air conduit 34 which serves as an air inlet, through which dehumidified air can flow into the intermediate space 24. The dry air furthermore can flow into the hollow space 20 between the outer primary window pane 2 and the inner primary window pane 4 through the bore 6 in the inner primary window pane 4 in order to prevent fogging or frost in this hollow space. If additional air needs to flow into the intermediate space 24 or the hollow space 20, this additional air comprises air from the air-conditioning system or dehumidifying system 32 only in order to prevent the admission of humid air from other sources.

Figure 6A:
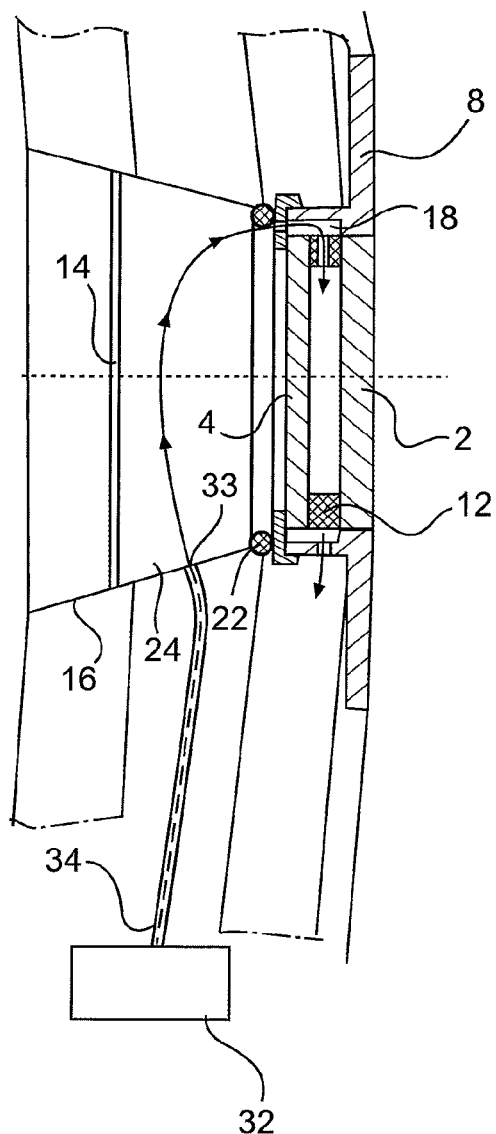
FIG. 6A and FIG. 6B show another exemplary embodiment of the vehicle window according to the present disclosure.
Figure 6B:
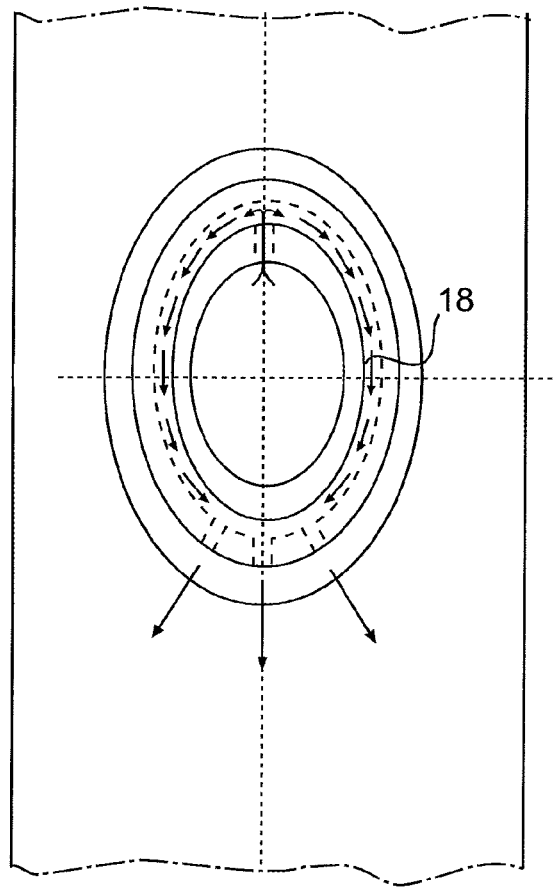

FIG. 6 ultimately shows a modification of the vehicle window of FIG. 5, in which the inner primary window pane 4 does not comprise a bore 6, but the press-on frame 10 is provided with a bore 26, through which an air exchange between the intermediate space 24 and the hollow space 20 can take place.

Figure 7:
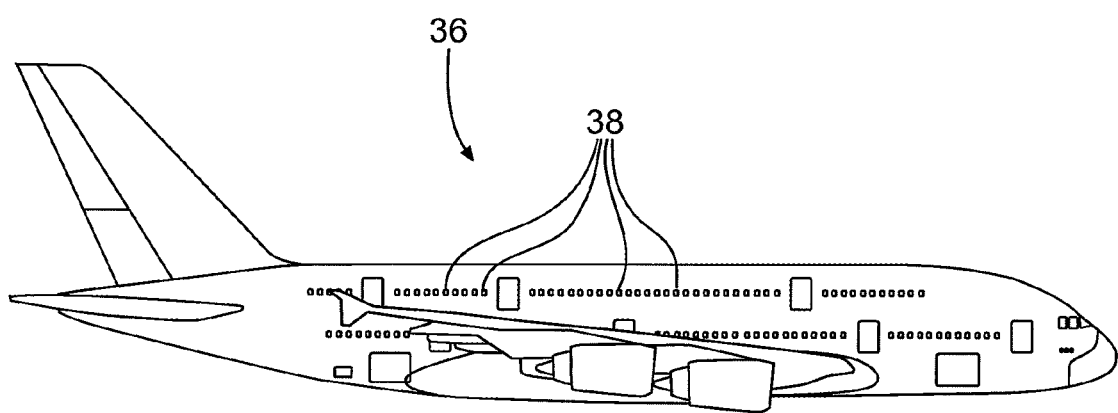
FIG. 7 shows an aircraft that is equipped with a plurality of vehicle windows according to the present disclosure.

In conclusion, FIG. 7 shows an aircraft 36 with a series of windows 38 that are realized in accordance with the aforementioned features according to the various teachings of the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A vehicle window, comprising:
    a primary window pane arrangement having an outer primary window pane and an inner primary window pane;
    a secondary window pane that is spaced apart from the primary window pane arrangement; and
    a window funnel that extends between the secondary window pane and the primary window pane arrangement,
    wherein an intermediate space formed by the window funnel, the secondary window pane and the primary window pane arrangement is sealed and includes an air inlet for introducing dehumidified air into the intermediate space.

2. The vehicle window of claim 1, wherein a sealing element is arranged between the window funnel and a boundary surface of the primary window pane arrangement which is directed toward the secondary pane.

3. The vehicle window of claim 1, in which the primary window pane arrangement further comprises a press-on frame for pressing an inner primary window pane against a window frame and simultaneously forming a hollow space that is connected to a condensation channel for dehumidifying air, and the hollow space and the intermediate space are fluidically connected.

4. The vehicle window of claim 3, wherein the press-on frame further comprises a bore for producing the fluidic connection between the hollow space and the intermediate space.

5. The vehicle window of claim 1, wherein the intermediate space is connected to a separate condensation channel that is formed in the vehicle window or on the vehicle window.

6. An aircraft with a fuselage, comprising:
    a plurality of vehicle windows that respectively include a primary window pane arrangement having an outer primary window pane and an inner primary window pane, a secondary window pane that is spaced apart from the primary window pane arrangement and a window funnel that extends between the secondary window pane and the primary window pane arrangement,
    wherein an intermediate space formed by the window funnel, the secondary window pane and the primary window pane arrangement is sealed and includes an air inlet for introducing dehumidified air into the intermediate space.

7. The aircraft of claim 6, wherein the air inlet is connected to an air source of an air-conditioning system.

8. The aircraft of claim 6, wherein the air inlet is connected to an air dehumidifying device.

9. The aircraft of claim 7, wherein the primary window pane arrangement comprises a press-on frame for pressing an inner primary window pane against a window frame and simultaneously forming a hollow space, and the hollow space and the intermediate space are fluidically connected.

10. A vehicle window, comprising:
    a primary window pane arrangement having an outer primary window pane and an inner primary window pane, including a press-on frame for pressing the inner primary window pane against a window frame and simultaneously forming a hollow space that is in communication with a condensation channel that provides dehumidifying air;
    a secondary window pane spaced apart from the primary window pane arrangement;
    a window funnel that extends between the secondary window pane and the primary window pane arrangement; and
    an intermediate space defined by the window funnel, the secondary window pane and the primary window pane arrangement that is sealed and includes an air inlet for introducing dehumidified air into the intermediate space,
    wherein the hollow space and the intermediate space are fluidically connected.

11. The vehicle window of claim 10, wherein the press-on frame further comprises a bore for producing the fluidic connection between the hollow space and the intermediate space.

12. The vehicle window of claim 10, wherein the intermediate space is connected to a separate condensation channel that is formed in the vehicle window or on the vehicle window.

13. The vehicle window of claim 10, wherein a sealing element is arranged between the window funnel and a boundary surface of the primary window pane arrangement which is directed toward the secondary pane.

* * * * *